US000001900H

United States Statutory Invention Registration [19]

[11] Reg. Number: H1,900

Holmes

[45] Published: Oct. 3, 2000

[54] METHOD OF COMBATING INSECT EGGS

[75] Inventor: Keith A. Holmes, Cary, N.C.

[73] Assignee: Rhône-Poulenc Ag Company Inc., Research Triangle Park, N.C.

[21] Appl. No.: 09/145,270

[22] Filed: Sep. 2, 1998

Related U.S. Application Data

[60] Provisional application No. 60/058,445, Sep. 10, 1997.

[51] Int. Cl.[7] ..... A01N 43/56

[52] U.S. Cl. ..... 514/404; 514/406; 514/341

*Primary Examiner*—Harold J. Tudor

*Attorney, Agent, or Firm*—Burns, Doane, Swecker & Mathis, L.L.P.

[57] ABSTRACT

A method of destroying insect eggs and a method of protecting crops from the insects resulting from the eggs wherein a compound of formula (I) is applied to the eggs

8 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF COMBATING INSECT EGGS

This application claims priority of copending U.S. provisional patent application Ser. No. 60/058,445, filed Sep. 10, 1997, incorporated by reference herein in its entirety and relied upon.

This nvention relates to a new method of combating imcrt at the egg level of development at a locus at which there is a growing crop, especially a plantation crop. The invention is also directed to a method of protecting crops.

Many insecticides are well known as active ingredients to protect plants against insects. However the compounds which are recommended purely for their ovicidal action are rather rare, and those which have both an insecticidal and an ovicidal action are also rather rare. It is generally accepted that in the art of insecticides for cotton, plants which have a gene incorporated in them which encodes for *Bacillus thuringiensis* delta-endotoxin expression are not effective against eggs. Thus there exists a need for new insect ovicides. From the activity of a compound on insects (adults or larvae), nothing can be deduced regarding the activity on eggs. Fo9r example, insecticides such as carbaryl or phosphate insecticides are not ovicidal. Pyrethroids are not ovicidal either; if they have been sometimes considered as ovicidal, it is just because they are able to kill the larvae when going out from the eggs, but this is not a true ovicidal action. Thiodicarb is considered as having both an ovicidal and an insecticidal action, but it is rather an exception.

An object of the present invention is to provide a new method for insect egg control. Another object of the present invention is to provide a new method of protecting crops. These objects are met in whole or in part by the present invention.

The present invention provides a meythod of destroying eggs of insects whereby a compound of formula (T):

(I)

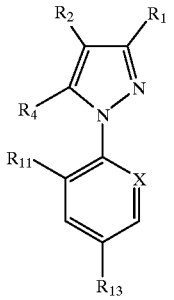

wherein:

$R_1$ is CN or methyl or a halogen atom;

$R_2$ is $S(O)_nR_3$ or 4,5-dicyanoimidazol 2-yl or haloalkyl;

$R_3$ is alkyl or haloalkyl;

$R_4$ is selected from the group consisting of hydrogen, halogen, —$NR_5R_6$, —$C(O)OR_7$, —$S(O)_mR_7$, alkyl, haloalkyl, —$OR_8$, —N=$C(R_9)(R_{10})$ and —C(O)alkyl;

$R_5$ and $R_6$ are independently selected from a hydrogen atom, alkyl, haloalkyl, —C(O)alkyl, —$C(O)OR_7$, —$S(O)_rCF_3$; or $R_5$ and $R_6$ form together a divalent alkylene radical which may be interrupted by one or more heteroatoms, preferably selected from oxygen, nitrogen and sulfur;

$R_7$ is selected from alkyl and haloalkyl;

$R_8$ is selected from alkyl, haloalkyl and hydrogen;

$R_9$ is selected from hydrogen and alkyl;

$R_{10}$ is selected from phenyl or heteroaryl each of which is unsubstituted or substituted by one or more hydroxy, halogen, —O-alkyl, —S-alkyl, cyano, or alkyl or combinations thereof;

X is selected from nitrogen and —C—$R_{12}$;

$R_{11}$ and $R_{12}$ are independently selected from halogen or hydrogen or CN or $NO_2$;

$R_{13}$ is selected from halogen, haloalkyl, haloalkoxy, —$S(O)_qCF_3$, —$SF_5$; m, n, q, r are independently selected 0, 1, and 2; provided that when $R_1$ is methyl, $R_3$ is haloalkyl, $R_4$ is $NH_2$, $R_{11}$ is Cl, $R_{13}$ is $CF_3$, and X is N and provided that when $R_2$ is 4,5-dicyanoimidazol 2-yl, $R_4$ is Cl, $R_{11}$ is Cl, $R_{13}$ is $CF_3$, and X is =C–Cl; or a pesticidally acceptable salt thereof is applied on the eggs.

The alkyl and alkoxy groups and moleties thereof of the formula (I) are preferabloy lower alkyl and alkoxy groups, that is, groups having one to six carbon atoms. The haloalkyl and haloalkoxy groups likewise preferably have one to four carbon atoms. The haloalkyl and haloalkoxy gro0ups can bear one or more halogen atoms; preferred groups of this type include —$CF_3$ and —$OCF_3$. It shall be understood that the ring formed by the divalent alkylene radical represented by $R_5$ and $R_6$ and including the nitrogen atom to which $R_5$ and $R_6$ are attached is generally a 5, 6, or 7-membered ring. When $R_{10}$ is heteroaryl, it is preferably pyridyl, most preferably 2-pyridyl. It will be understood that the 1-arylpyrazoles of formula (I) include enantiomers and/or diastereomers thereof.

A preferred group of 1-arylpyrazoles for use in the present invention are those of formula (I) with one or more of the following features wherein:

$R_1$ is CN;

$R_4$ is —$NR_5R_6$;

$R_5$ and $R_6$ are independently selected from the hydrogen atom, alkyl, haloalkyl, C(O)alkyl, $C(O)OR_7$;

X is C—$R_{12}$; or $R_{13}$ is selected from a halogen atom, haloalkyl, haloalkoxy, and —$SF_5$.

Another preferred group of 1-arylpyrazoles of formula (I) for use in the present invention is that wherein:

$R_1$ is CN;

$R_3$ is a haloalkyl radical;

$R_4$ is $NH_2$;

X is C—$R_{12}$;

$R_{11}$ and $R_{12}$ represent, independently of one another, a halogen atom; and $R_{13}$ is a haloalkyl radical.

A most preferred compound is 5-amino-1-(2,6-dichloro-4-trifluoromethyl phenyl)-4-trifluoromethylsulfinyl-3-cyanopyrazole, hereafter designated as compound (A). Another highly preferred compound according to the present invention is 5-amino 1-(2,6-dichloro-4-trifluoromethylphenyl)-4-ehtylsulfinyl-3-cyanopyrazole, hereafter designated as compound (B).

Compounds of formula (I) and compositions containing them may be prepared according to known processes, for example as described in International Patent Publications WO 87/3781, 93/6089, and 94/21606 as well as in European Patent Applications 295117, 403300, 385809 or 679650, German Patent Publication 19511269 and U.S. Pat. Nos. 5232940 and 5236938 or other process according to the knowledge of a man skilled in the art of chemical synthesis, which is deemed to incloude the Chemical Abstract and the literature referred to therein. Compositions comprising the compounds of formula (I) may also be prepared according to the teaching of same prior art or similar one.

The present invention also provides a method of protecting a crop by combating eggs of insects susceptible to damage the said crop whereby an effective amount of a compound of formula (I), or a pesticidally acceptable salt thereof, is applied at a crop locus where there are eggs.

The crops that may be protected by the means of the present invention include cotton, rice, corn and vegetable crops.

The insect eggs that generally controlled or destroyed by the means of the present invention include those of *Heliothis spp.,* preferably *Heliothis zea,* and rice leaffolders and rice stemborers, preferably *Chilo suppressalis* and *Tryporyza incetulas.*

By the term "eggs" as used in this specification, it is to be understood eggs which are in their simple state laid upon the soil or on the plant or eggs which are inside a pregnant insect. Most of the eggs which are to be killed according to the present invention are eggs upon leaves, so that the method whereby a compound of formula (I), or a pesticidally acceptable salt thereof, is applied is also a treatment of leaves of crops.

The compounds of the invention may be applied once, or more than once. Thus, for some crops one may apply the ovicidal compounds periodically through the growing season. Usually ovicidal compositions according to the invention are applied to the crop area at a rate of 0.04 to 2 kg/ha of active ingredient, preferably 0.1 to 1 kg/ha.

Ovicidal compositions according to the invention may be applied in a manner which is safe for the crop.

The ovicidal concentrated compositions according to the invention may be in the form of a solid, e.g. dusts or granules or wettable powders, or, preferably, in the form of a liquid, such as an emulsifiable concentrate or a true solution. The concentrated compositions are the compositions which are commercialized or transported or stored. For application to plant they are normally diluted in water and applied in such a diluted form. The diluted form are part of the invention as well as the concentrated forms.

The concentrated ovicidal compositions of the inventions contain generally form 0.001 to 90% of active ingredient of formula (I), or a salt thereof. A concentrate may contain from 5 to 90% of active ingredient. Parts and percentages in this specification are by weight unless otherwise indicated.

The ovicidal compositions may also contain all kind of compatible surface active agent and/or carrier. The agriculturally acceptable carrier may be solid or liquid. The composition may further contain a fertilizer.

The compounds of formula (I), or a salt thereof, may be used in sequence or admixture, particularly admixtures with another pesticide e.g. an insecticide, acaricide or fungicide.

The ovicidal compositions may be prepared by admixing the ingredients.

The invention is illustrated by the following test examples.

EXAMPLE 1

Cotton bollworm (*Heliothis zea*) eggs were placed on cotton leaves of a growing cotton plant. Compound (A) as a 2.5% emulsifiable concentrate (as the product REGENT®) was applied to the leaves at rates ob 0.37 and 0.037 kg/Ha. The leaves infested with eggs were removed from the plant, placed in petri dishes on water moistened paper. After three days, at both rates, all eggs were dead.

EXAMPLE 2

Example 1 was repeated using Compound (B) at rates of 0.37 and 0.11 kg/Ha. After three days, at 0.37 kg/Ha, about 59% of the eggs were dead. After three days, at 0.11 kg/Ha, about 23% of the eggs were dead.

EXAMPLE 3

Compound (A) as a 50% suspended concentrate formulation (as in ASCEND®) was applied at 25 g/Ha as a leaf dip to freshly cut rice leaves which had on them the eggs of Yellow stemborer *Tryporyza incertulas*) and Striped stemborer (*Chilo suppressalis*). The leaves were kept moist in test tubes for 7 to 9 days. Five replicates were made. For Striped stemborer, an averge of 30% of the eggs did not hatch versus a control experiment. For Yellow stemborer, an average of 2% of the eggs did not batch versus a control experiment.

EXAMPLE 4

Adults of Striped stemborer and Rice Leaffolder were allowed to oviposit on rice leaves petri dishes. Compound (A) as a 50% suspended concentrate formulation (as in ASCEND®) was applied to the eggs of Striped stemborer and Rice Leaffolder in petri dishes at rates of 25 g/Ha, 37.5 g/Ha and 50 g/Ha. Five replicates were performed. After about 6 days the following averaged results were observed:

| Rate of Compound (A) g/Ha | % Non Hatched Eggs |
|---|---|
| Rice Leaffolder | |
| 25 | 51 |
| 37.5 | 61.5 |
| 50 | 71 |
| Striped Stemborer | |
| 25 | 7 |
| 37.5 | 47 |
| 50 | 67 |

What is claimed is:

1. A method destroying eggs of insects whereby a compound of formula (I):

(I)

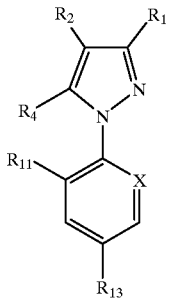

wherein:

$R_1$ is CN or methyl or a halogen atom;

$R_2$ is $S(O)_nR_3$ or 4,5-dicyanoimidazol 2-yl or haloalkyl;

$R_3$ is alkyl or haloalkyl;

$R_4$ is selected from the group consisting of hydrogen, halogen, —$NR_5R_6$, —$C(O)OR_7$, —$S(O)_mR_7$, alkyl, haloalkyl, —$OR_8$, —N=$C(R_9)(R_{10})$ and —C(O)alkyl;

$R_5$ and $R_6$ are independently selected from a hydrogen atom, alkyl, haloalkyl, —C(O)alkyl, —$C(O)OR_7$, —$S(O)_rCF_3$; or $R_5$ and $R_6$ form together a divalent alkylene radical which may be interrupted by one or more heteroatoms. preferably selected from oxcygen, nitrogen and sulfur;

$R_7$ is selected from alkyl and haloalkyl;

$R_8$ is selected from alkyl, haloalkyl and hydrogen;

$R_9$ is selected from hydrogen and alkyl;

$R_{10}$ is selected from phenyl or heteroaryl each of which is unsubstituted or substituted by one or more hydroxy, halogen, —O-alkyl, —S-alkyl, cyano, or alkyl or combinations thereof;

X is selected from nitrogen and —C—$R_{12}$;

$R_{11}$ and $R_{12}$ are independently selected from halogen hydrogen or CN or $NO_2$;

$R_{13}$ is selected from halogen, haloalkyl, haloalkoxy, —$S(O)_qCF_3$, —$SF_5$; m, n, q, r are independently selected from 0, 1, and 2; provided that when $R_1$ is methyl, $R_3$ is haloalkyl, $R_4$ is $NH_2$, $R_{11}$ is Cl, $R_{13}$ is $CFR_3$, and X is N and provided that when $R_2$ is 4,5-dicyanoimidazxol 2-yl, $R_4$ is Cl, $R_{11}$ is Cl, $R_{13}$ is $CF_3$, and X is ═C–Cl; or a pesticidally acceptable salt thereof is applkied on the eggs.

2. A methodd according to claim 1 wherein the compound of formula (I) has one or more of the following features:

$R_1$ is CN;

$R_4$ is —$NR_5R_6$;

$R_5$ $R_6$ are independently selected from the hydrogen atom, alkyl, haloalkyl, C(O)alkyl, C(O)$OR_7$;

X is C—$R_{12}$; or $R_{13}$ is selected from a halogen atom, haloalkyl, haloalkoxy, and —$SF_5$.

3. A method according to claim 1 wherein the compund of formula (I) is one wherein:

$R_1$ is CN;

$R_3$ is a haloalkyl radical;

$R_4$ is $NH_2$;

X is C—$R_{12}$;

$R_{11}$ and $R_{12}$ represent, independently of one another, a halogen atom; and $R_{13}$ is a haloalkyl radical.

4. A method according to claim 1 wherein the compound of formula (I) is 5-amino-1-(2,6-dichloro-4-trifluoromethyl phenyl)-4-trifluoromethylsulfinyl-3-cyanopyrazole or 5-amino 1(2,6-dichloro-4-trifluoromethylphenyl)-4-ethylsulfinyl-3-cyanopyrazole.

5. A method of protecting a crop by combating eggs of insects susceptible to damage the said crop whereby an effective amount of a compound of formula (I) as defined in claim 1, or a pesticidally acceptable salt thereof, is applied at a crop locus where there are eggs.

6. A method according to claim 5 wherein the crop is cotton, rice, corn or vegetables.

7. A method according to claim 5 wherein the compound of formula (I) is applied from 0.01 to 2 kg/Ha.

8. A method accordinbg to claim 1 wherein the eggs are those of *Heliothis xzea, Chilo suppressalis, Tryporyza incertulas* or Rice Leaffolder.

* * * * *